United States Patent [19]

Exner

[11] 3,743,859

[45] July 3, 1973

[54] ELECTRIC SWITCHING DEVICE INCLUDING THYRISTORS

[75] Inventor: Emil August Exner, Emmasingel, Eindhoven, Netherlands

[73] Assignee: U.S. Philips Corporation, New York, N.Y.

[22] Filed: Jan. 26, 1972

[21] Appl. No.: 221,000

[30] Foreign Application Priority Data

Feb. 11, 1971 Netherlands .................... 7101794

[52] U.S. Cl. .... 307/252 K, 307/252 H, 307/252 W, 307/252 Q

[51] Int. Cl. ........................................ H03k 17/56

[58] Field of Search .................... 307/252 H, 252 J, 307/252 K, 252 W, 252 Q

[56] References Cited

UNITED STATES PATENTS 3,662,250 5/1972 Piccone et al. ................ 307/252 Q

*Primary Examiner*—John Zazworsky
*Attorney*—Frank R. Trifari

[57] ABSTRACT

An electric switching device which includes at least two thyristors connected in parallel across a pair of supply conductors. The primary winding of a transformer is connected in one supply conductor and the secondary winding (or windings) is connected to the thyristor control electrodes. When one thyristor conducts it causes a current flow in said primary winding thereby inducing a control pulse in the secondary winding that in turn triggers the remaining thyristors into conduction. The device prevents an overload on the first thyristor to conduct.

4 Claims, 4 Drawing Figures

ELECTRIC SWITCHING DEVICE INCLUDING THYRISTORS

The present invention relates to an electric switching device provided with at least two parallel branches each of which includes a thyristor and a current limiting circuit element, in which the ends of the parallel branches are connected to a first and a second supply conductor while the control circuits for all thyristors are coupled together.

An electric switching device as described above is known, for example, from U.S. Pat. No. 3,218,476. A drawback of this known switching device is that it requires a plurality of transformer windings through which main currents flow and which is at least equal to the number of parallel branches. If the number of parallel branches is three, the number of transformer windings through which main currents flow is already six. Thus this device requires a relatively large number of transformer windings proportioned for large currents.

An advantage of the previously mentioned known device is that when one of the parallel branches begins to conduct the other branches follow automatically so that overload of the thyristor in the first conducting branch is prevented. This is, however, realized with the fairly complicated solution mentioned above, employing a large number of transformer windings.

Furthermore, it is to be noted that it is known from French Patent 1461532 that in an electric switching device including a number of parallel branches, each of which includes a thyristor, only one transformer is used whose primary winding is present in a supply conductor of the device and whose secondary winding is coupled to the control circuits for the other thyristors. A drawback of the device according to this French Patent is, however, that in order to render the device conductive first one given thyristor must be made to conduct and only then can a current flow through the primary winding of this transformer. If this first (preferred) thyristor fails, the device will not start conducting at all.

An object of the present invention is to provide an electric switching device of the kind described in the preamble which eliminates the requirement for a complicated embodiment rising a large number of transformer windings through which main currents flow, and which also solves the problem that upon failure of a first preferred thyristor, the entire switching device cannot then be made to conduct.

According to the invention an electric switching device provided with at least two parallel branches each of which includes a thyristor and a current-limiting circuit element, in which the ends of the parallel branches present on the anode sides of the thyristors are mutually connected — and are furthermore connected to a first supply conductor — and in which the other ends of the parallel branches which are present on the cathode sides of the thyristors are mutually connected — and are furthermore connected to a second supply conductor — while the control circuits for all thyristors are coupled together, is characterized in that at least one of the two supply conductors incorporates a primary winding of a transformer while the control circuits for the thyristors are connected to one or more secondary windings of said transformer in such a manner that upon any of the thyristors becoming conductive a current flows through the primary winding of the transformer. This current induces a voltage (voltages) in the secondary winding(s) of the transformer, which voltage(s) is (are) passed to the control electrode(s) of the subsequent thyristor(s) which thereby also conducts.

An advantage of this electric switching device is that I use only one transformer winding through which a main current flows. Auxiliary currents, are obtained via the current i.e., control currents flow through the secondary winding or the secondary windings of this transformer.

It is feasible that the control circuits for the thyristors are largely separated from each other.

In a preferred embodiment of an electric switching device according to the invention, the transformer has only one secondary winding and the control circuits for the thyristors have a common control conductor which is connected to this secondary winding.

An advantage of this preferred embodiment is that the circuit is very simple for it requires only one secondary winding of a transformer and the control circuits are also simple.

The electric switching device may be used, for example, for switching on an electric motor or for switching on another load; or for short-circuiting a load.

In a preferred embodiment in which the load includes a gas discharge flash lamp (electronic flash lamp), the supply circuit of this lamp includes an electric switching device according to the invention. An advantage thereof is that near these lamps, which convey very large currents, a satisfactory switching device may be present which insures that whenever anyone of the thyristors becomes conductive the other thyristors immediately follow.

In a further preferred embodiment a gas discharge flash lamp is also present in which a circuit comprising said lamp is shunted by an electric switching device according to the invention.

Such a preferred embodiment has the advantage that the load, namely the electronic flash lamp, can be shunted reliably in a very simple manner. This is desired, for example, when a flash of only a very short duration is to be obtained, the command for stopping the flash originating from a photo-sensitive element with which a signal is given for at least one of the thyristors of the switching device.

In order that the invention may be readily carried into effect, some embodiments thereof will now be described in detail, by way of example, with reference to the accompanying diagrammatic drawings in which.

Figure 1:
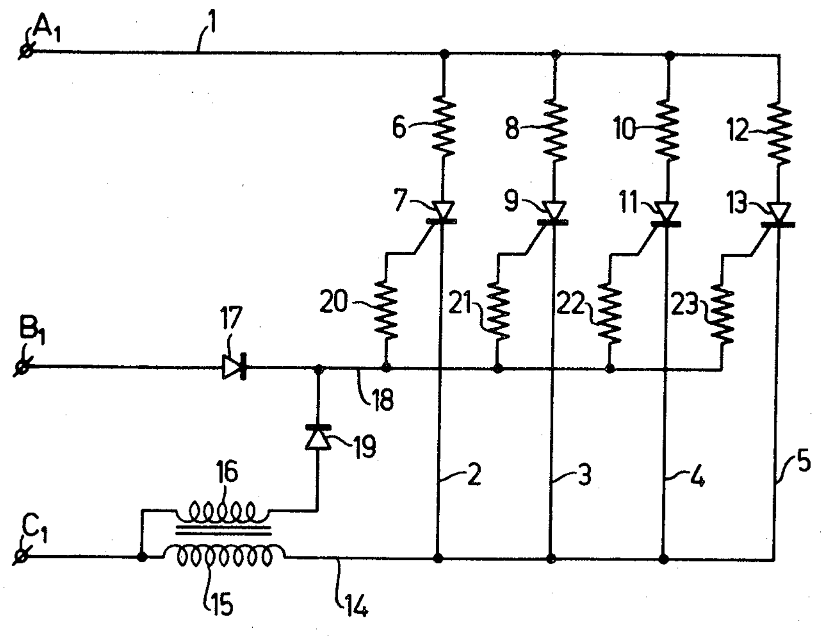
FIG. 1 shows an electrical circuit diagram of a switching device according to the invention.

In FIG. 1 the reference A1, B1, and C1 denote input terminals for an electric switching device. A first supply conductor 1 having four mutually parallel branches (2 to 5) connected thereto is connected to input terminal A1. Branch 2 includes a current-limiting circuit element in the form of a resistor 6 and a thyristor 7.

Branch 3 likewise includes a resistor 8 and a thyristor 9. Branch 4 is provided with a resistor 10 and a thyristor 11. Finally, branch 5 is provided with a resistor 12 in series with a thyristor 13. The branches 2, 3, 4 and 5 are connected to a second supply conductor 14. This second supply conductor 14 incorporates a primary winding 15 of a transformer. This winding is connected to input terminal C1. A secondary winding of the transformer is denoted by the reference numeral 16. The input terminal B1 is connected to a diode 17 which is in turn connected to a common control lead 18. The secondary winding of transformer 16 is likewise connected through a diode 19 to the common control lead 18. A control electrode of thyristor 7 is connected through a resistor 20 to the common control lead 18. In a corresponding manner the control electrode of thyristor 9 is connected through a resistor 21 to the lead 18. Similarly, the control electrodes of thyristors 11 and 13 are connected to the control lead 18 through resistors 22 and 23, respectively.

The terminals A1 and C1 of the circuit of FIG. 1 are terminals through which main currents flow. On the other hand the input terminal B1 serves to convey a control current, namely for giving a command to render a thyristor conducting.

The operation of the circuit of FIG. 1 is as follows.

The terminals A1 and C1 are connected to a positive and a negative terminal, respectively, of an arrangement in which this switching device must operate. Terminal B1 is connected to an auxiliary arrangement which generates a control signal. If a pulse is applied to B1 it will be passed through diode 17 and control conductor 18 to the control electrodes of the thyristors 7, 9, 11 and 13. This is effected through resistors 20, 21, 22 and 23, respectively. Thereupon at least one of these four thyristors will begin to conduct. Subsequently a current flows through A1 and the first supply conductor 1 and the parallel branch including the thyristor which has become conductive. This current flows back to C1 through the second supply conductor 14 and the primary winding 15 of the transformer. The current flowing through the primary winding 15 generates a voltage in the secondary winding 16 of this transformer, which voltage is applied through the diode 19 to the common control conductor 18. A pulse is then again applied through this common control conductor to the control electrodes of the thyristors which thereupon can also begin to conduct. An advantage thereof is that when any of the thyristors at first begins to conduct a further pulse is subsequently generated so that any of the other thyristors not yet conducting can likewise be made to conduct. This is inter alia, also important for the case where one of the thyristors is defective.

Figure 3:
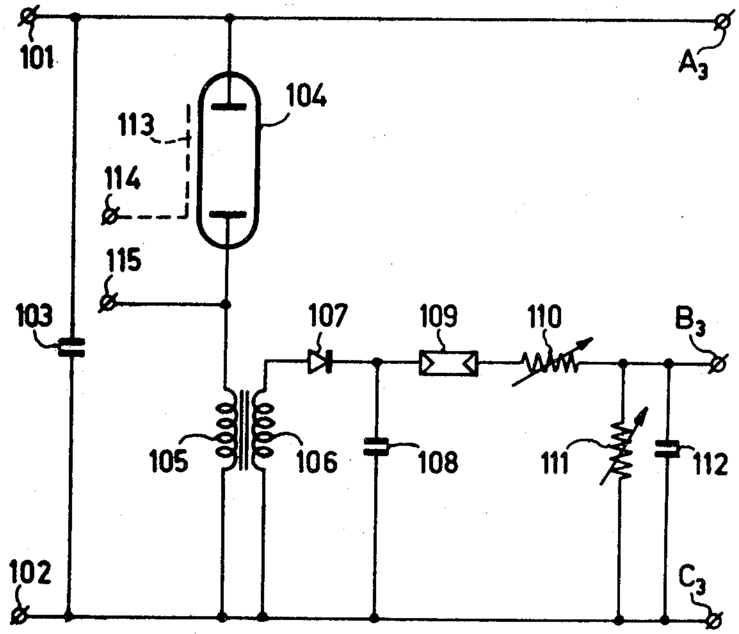
FIG. 3 shows part of an electrical circuit of a gas discharge flash lamp to which a switching device according to FIG. 1 or FIG. 2 may be connected.
Figure 4:
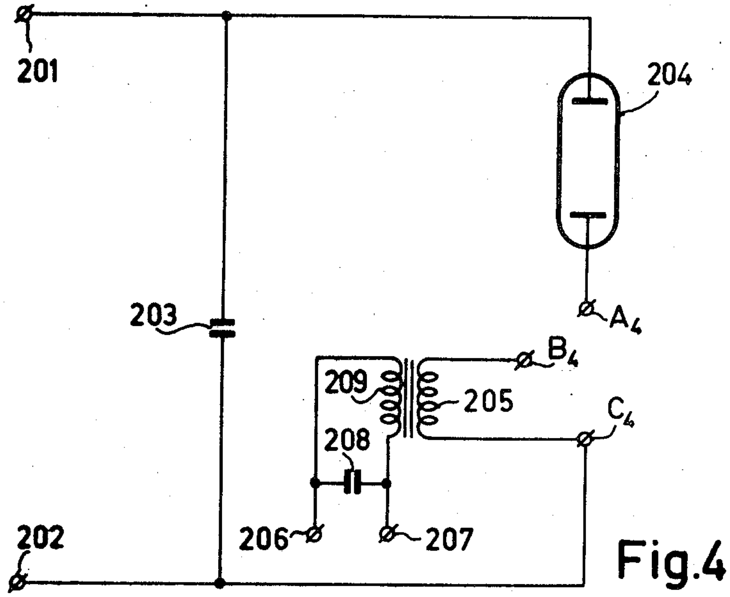
FIG. 4 shows part of a second circuit for a gas discharge flash lamp which circuit may likewise be combined with an electric switching device according to FIG. 1 or FIG. 2.

For a further use of the circuit of FIG. 1 in a circuit including a gas discharge flash lamp, reference is made to the description of FIGS. 3 and 4.

Figure 2:
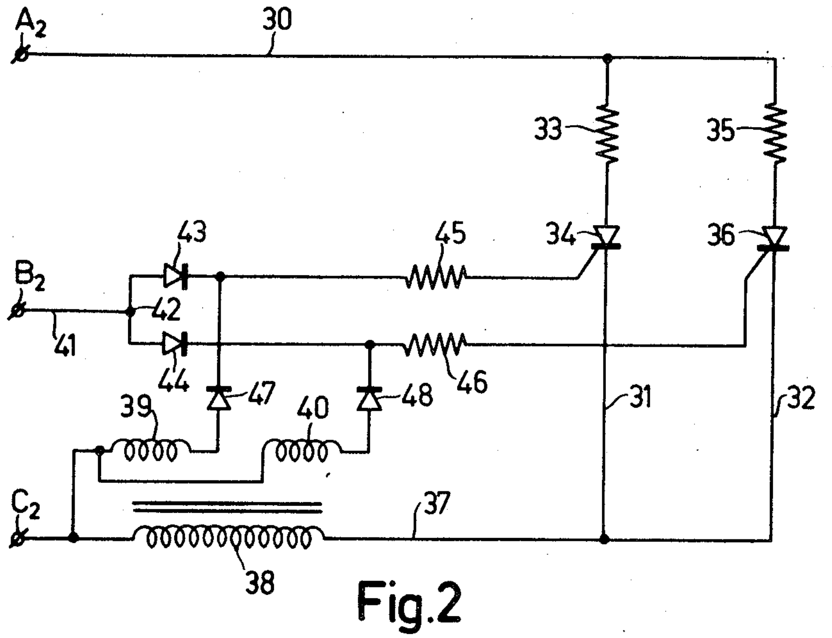
FIG. 2 shows a second electrical circuit diagram of a switching device according to the invention.

In FIG. 2 the reference A2, B2 and C2 again denote input terminals which correspond to the terminals A1, B1 and C1 of FIG. 1. The reference numeral 30 denotes a first supply conductor which is connected to the input terminal A2. Two parallel branches 31 and 32 are connected to supply conductor 30. Branch 31 includes a resistor 33 and a thyristor 34. Branch 32 includes a resistor 35 in series with a thyristor 36. The two branches 31 and 32 are also connected to a second supply conductor 37. This conductor is connected to terminal C2 through a primary winding 38 of a transformer. The transformer whose primary winding is denoted by the reference numeral 38 includes two secondary windings 39 and 40. Terminal B2 is connected to a conductor 41 which is split at a junction 42 into a branch including a diode 43 and a second branch including a diode 44. The other side of diode 43 is connected through a resistor 45 to a control electrode of thyristor 34 and the other side of diode 44 is connected through a resistor 46 to a control electrode of thyristor 36. The secondary winding 39 of the transformer is connected through a diode 47 to a junction between diode 43 and resistor 45. The secondary winding 40 is connected through a diode 48 to a junction between diode 44 and resistor 46.

The operation of the circuit of FIG. 2 is broadly the same as that of FIG. 1. The fact that in FIG. 2 only two parallel branches are shown instead of four as in FIG. 1 is not important in this respect, but it is important as regards the connection between the control electrodes of the thyristors and the transformer. In FIG. 2 a secondary winding such as 39 and 40 is incorporated for each parallel branch while in FIG. 1 only one secondary winding (16) is provided for this purpose. When a pulse is applied to the circuit of FIG. 2 through B2, the pulse is distributed over diodes 43 and 44 and is passed on in this manner to the control electrodes of both thyristor 44 (through resistor 45) and thyristor 36 (through resistor 46). When one of these thyristors conducts, for example, thyristor 34, a current will flow through the parallel branch 31, i.e., a current flows in the circuit denoted by terminal A2, first supply conductor 30, parallel branch 31, supply conductor 37, primary winding 38, and terminal C2. The current thereby flowing in the transformer induces a voltage in both the secondary winding 39 and the secondary winding 40 of the transformer. This voltage is applied through the diodes 47 and 48 and the resistors 45 and 46, respectively, to the control electrodes of the two thyristors. To apply a control pulse to the control electrode of thyristor 34 is not necessary in this case because this thyristor is already conducting. However, the voltage which is induced in the secondary winding 40 applies a voltage pulse to the control electrode of thyristor 36 so that this thyristor can begin to conduct. The secondary winding 39 is only important when thyristor 36 conducts at an earlier instant than thyristor 34.

FIGS. 1 and 2 show embodiments in which a terminal B for applying a command signal to render the switching device conducting is always used. It is also feasible that such a terminal is not present and that one or more of the thyristors of the switching device are formed as photosensitive thyristors (Light Activated Silicon Controlled Rectifiers).

In FIG. 3 the reference numerals 101 and 102 denote connection terminals which are adapted to be connected to an arrangement for DC charging a capacitor 103 which is arranged between terminals 101 and 102. In the Figure the reference numeral 104 denotes an electronic flash lamp (gas discharge flash lamp). This lamp is arranged in series with a primary winding 105 of a transformer. The series arrangement of flash lamp 104 and transformer winding 105 shunts the capacitor 103. The secondary winding of the transformer whose primary winding is denoted by the reference numeral 105 is denoted by reference numeral 106. One end of the transformer winding 106 is connected to a diode 107 and then to a capacitor 108. The other end of capacitor 108 is connected to the other end of the transformer winding 106. Capacitor 108 is shunted by a series arrangement of a photosensitive resistor 109, a variable adjusting resistor 110 and a subsequent variable adjusting resistor 111. Variable adjusting resistor 111 is in turn shunted by a capacitor 112. One end of capacitor 112 is connected to the output terminal B3 and the other electrode of capacitor 112 is connected to output terminal C3. The junction of terminal 101 and flash lamp 104 is connected to an output terminal A3. Furthermore, FIG. 3 diagrammatically shows a control electrode for flash lamp 104, which electrode is denoted by the reference numeral 113. This control electrode is connected to a terminal 114. One main electrode of the lamp 104 is also connected to a connection terminal 115.

A device as shown in FIG. 1 may be connected to the terminals A3, B3 and C3 a manner such that A3 is connected to A1, B3 is connected to B1 and C3 is connected to C1. In that case the switching device of FIG. 1 may serve to short-circuit the branch 104, 105 of the flash lamp. This may occur, for example, when it is desired to quench the flash from the flash lamp 104 at an earlier instant. The operation of the combination of FIG. 3 and FIG. 1 is then, for example, as follows. Firstly, an arrangement not shown DC charges capacitor 103 through terminals 101 and 102. Subsequently, a voltage is applied between the terminals 114 and 115 by an apparatus not further shown, at the same time when the camera contact is shut upon taking a photograph. As a result a voltage will be present on the trigger electrode 113 so that the flash lamp 104 ignites. Consequently a current will flow through the primary winding 105 of the transformer which is arranged in series with the lamp 104. Therefore, a voltage also will be generated in the secondary winding 106 so that capacitor 108 will be charged. Lamp 104 exposes an object, while a part of the light reflected by this object is directed back onto the photosensitive resistor 109. As a result the resistance thereof will decrease. Due to the reduced resistance of resistor 109 a current will then flow from capacitor 108 to capacitor 111. When a given quantity of light has fallen on the resistor 109, capacitor 112 will have obtained such a high charge that a voltage is obtained through terminal B3 and the terminal B1 and the diode 17 of the circuit of FIG. 1, which voltage is sufficient to make one of the thyristors 7, 9, 11 and 13 conduct. In the manner already discussed with reference to FIG. 1, the entire switching device of FIG. 1 will then become conductive and hence a current will flow from A3 through A1 to C1 and thus to C3. This conducting state of the switching device of FIG. 1 then provides, as it were, a short circuit of the branch 104, 105 of FIG. 3 so that the flash lamp 104 is extinguished.

It is alternatively possible to combine the circuit of FIG. 3 with that of FIG. 2, namely by connecting the terminals A3 to A2, B3 to B2 and C3 to C2. The operation of this circuit is substantially the same as that described with reference to the combination of FIG. 3 and FIG. 1.

In FIG. 4 the reference numerals 201 and 202 again denote input terminals across which are connected a capacitor 203. The reference numeral 204 denotes a discharge flash lamp. This lamp has two electrodes, one of which is connected to the terminal 201 and the other is connected to a terminal A4. A terminal C4 in FIG. 4 is connected to the input terminal 202. A terminal B4 is connected to terminal C4 through the transformer winding 205. Reference numerals 206 and 207 denote two further input terminals which are connected together through a capacitor 208. Capacitor 208 is shunted by a winding 209 of the transformer. FIG. 4 shows a circuit for a discharge flash lamp which is fed from a capacitor 203, the latter being charged in the first instance to a voltage which is higher than the ignition voltage of the flash lamp 204. The circuit of FIG. 1 may be connected to A4, B4 and C4 by connecting A4 to A1, B4 to B1 and C4 to C1. It is alternatively possible to combine the circuits of FIG. 4 and FIG. 2 in which case the A terminals again are connected to A terminals, B terminals to B terminals and C terminals to C terminals.

In the devices according to the invention, satisfactory switching of large currents is then always possible.

What is claimed is:

1. An electric switching device comprising, at least two parallel branches each of which includes a thyristor and a current-limiting circuit element, in which the ends of the parallel branches present on the anode sides of the thyristors are connected together to a first supply conductor, and in which the other ends of the parallel branches which are present on the cathode sides of the thyristors are connected together to a second supply conductor, means for coupling together the control circuits for all of the thyristors, characterized in that at least one of the two supply conductors incorporates a primary winding of a transformer, means connecting the control circuits of the thyristors to one or more secondary windings of the transformer in such a manner that upon any of the thyristors becoming conducting a current flows through the primary winding of the transformer, said current inducing a voltage in the secondary windings of the transformer which is coupled to the control electrode of the subsequent thyristors which thereby also conduct.

2. An electric switching device as claimed in claim 1, characterized in that the transformer has only one secondary winding, and the control circuits of the thyristors have a common control conductor which is connected to said secondary winding.

3. An electric switching device comprising, a pair of supply terminals, a transformer having a primary winding and secondary winding means, at least two parallel connected branch circuits each of which includes a thyristor and a current limiting circuit element in series therewith, means connecting said primary winding in series circuit with said parallel branch circuits across the supply terminals, and means connecting the control electrodes of the thyristors to said secondary winding means so that conduction in any one thyristor produces a current flow in said primary winding which in turn induces a voltage in the secondary winding means of a magnitude to trigger into conduction a second one of the thyristors.

4. A switching device as claimed in claim 3 further comprising a control terminal coupled to the control electrodes of said thyristors and adapted to apply thereto an ignition control signal that is independent of the current flow in said transformer.

* * * * *